US009666072B2

(12) United States Patent
Fowe et al.

(10) Patent No.: US 9,666,072 B2
(45) Date of Patent: May 30, 2017

(54) DYNAMIC SPEED LIMIT

(71) Applicant: HERE Global B.V., Veldhoven (NL)

(72) Inventors: James Adeyemi Fowe, Evanston, IL (US); Andrew Dean, Chicago, IL (US); Leon Oliver Stenneth, Chicago, IL (US); Carol Walz, Chicago, IL (US); Matthew Vachlon, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 9 days.

(21) Appl. No.: 14/584,873

(22) Filed: Dec. 29, 2014

(65) Prior Publication Data

US 2016/0189540 A1 Jun. 30, 2016

(51) Int. Cl.
*G06F 19/00* (2011.01)
*G08G 1/0967* (2006.01)
*G08G 1/01* (2006.01)

(52) U.S. Cl.
CPC ....... *G08G 1/096775* (2013.01); *G08G 1/012* (2013.01); *G08G 1/0112* (2013.01); *G08G 1/0116* (2013.01); *G08G 1/0129* (2013.01); *G08G 1/0141* (2013.01); *G08G 1/0145* (2013.01); *G08G 1/096716* (2013.01); *G08G 1/096741* (2013.01)

(58) Field of Classification Search
CPC .......... G07C 5/08; G07C 5/008; G08B 21/00; G01C 21/34; G01C 21/3484
USPC .... 701/70, 93, 33.4, 23, 117, 408, 411, 537; 340/901, 905, 438, 439, 441
See application file for complete search history.

(56) References Cited

U.S. PATENT DOCUMENTS 2,922,981 A 1/1960 Anderson
6,275,710 B1 8/2001 Oinonen et al.
6,693,555 B1 2/2004 Colmenarez et al.
6,825,778 B2 11/2004 Bergan et al.
8,395,522 B2 * 3/2013 Kweon .................. B60K 35/00 340/438
8,711,005 B2 4/2014 Musachio
2011/0161004 A1 * 6/2011 Chao .................. G01C 21/3697 701/408
2012/0139755 A1 * 6/2012 Ginsberg ......... G08G 1/096716 340/905
2013/0179067 A1 * 7/2013 Trowbridge ........... G01C 21/34 701/410
2013/0253808 A1 * 9/2013 He ......................... G06Q 10/00 701/117
2014/0232561 A1 8/2014 Musachio
2015/0160024 A1 * 6/2015 Fowe ................. G01C 21/3461 701/400

* cited by examiner

*Primary Examiner* — Gertrude Arthur Jeanglaud
(74) *Attorney, Agent, or Firm* — Lempia Summerfield Katz LLC

(57) ABSTRACT

A variable speed limit is calculated based on weather. A computing device identifies an incident probability threshold indicative of an acceptable rate of incident for vehicular transportation. A weather condition indicator is determined for a road segment. The weather condition indicator describes current or future weather conditions at the road segment. The computing device calculates the variable speed limit, or a safety speed, for a vehicle traveling on the road segment based on a function of the incident probability threshold and the weather condition indicator.

20 Claims, 11 Drawing Sheets

50

60

DYNAMIC SPEED LIMIT

FIELD

The following disclosure relates to a dynamic speed limit, or more particularly, to systems and methods for calculating a dynamic speed limit based on historical incident data.

BACKGROUND

Driving at fast speeds gets passengers to their destinations more quickly. However, increased speeds also lead to accidents or other incidents on the road. Many legislative bodies set forth speed limits to define a legal maximum speed. The speed limits are assigned by road or road type. Speed limits range from 5 miles per hour to 90 miles per hour around the world. Ideally, speed limits are set to the fastest safe speed that can be traveled by the average user on the road. One major consideration for safety is the weather. Inclement weather affects the fastest safe speed that can be traveled on the road.

Different opinions or perspectives have been presented on the issue of whether higher speed limits cause more accidents. Some studies have shown that increasing the speed limit tends to increase accident rates, while others have shown that minor increases in the speed limit may actually decrease the overall accident rates. This is because drivers often drive at speeds defined by personal comfort zones. However, it is generally accepted that when faster speeds are traveled, more accidents occur. Also, the ideal speed for any given road is affected by weather, and a speed limit that is independent of weather conditions is not optimized for safety and efficiency.

SUMMARY

In one embodiment, an incident probability threshold indicative of an acceptable rate of incident for vehicular transportation is identified by a computing device. The computing device determines a weather condition indicator indicative of a weather condition for a road segment. The computing device calculates a safety speed for a vehicle traveling on the road segment based a function of the incident probability threshold and the weather condition indicator.

In one embodiment, an apparatus sends data indicative of a current location of the apparatus. Data indicative of a weather condition is accessed based on the current location of the apparatus. The apparatus receives a dynamic speed limit for a vehicle traveling on the road segment based a function of an incident probability threshold and the weather condition and performs perform a comparison of a current speed of the apparatus to the dynamic speed limit. The apparatus generates a message based on the comparison.

BRIEF DESCRIPTION OF THE DRAWINGS

Exemplary embodiments are described herein with reference to the following drawings.

DETAILED DESCRIPTION

Incident data may be collected over time. An incident may be a car accident or other unintended occurrence that occurs along a road. The incident may be a collision, a stalled vehicle, or a vehicle that has run off the road. The incident data may collected by the department of transportation through incidents reported by police or other emergency crews or reported by drivers. Those involved in an accident or observing an accident may call an accident reporting hotline. Incidents may also be detected through traffic cameras or other sensors. Incidents may be detected through smart phones or other mobile devices tied to location. The mobile devices may detect when a traveler stops moving at the expected rate of the road.

In all of these instances, the incident data may be tied to particular roads. For example, the roads may be formed of adjacent road segments or road links. The incident data may include an entry for each incident paired with the road segment on which the incident occurred and the time at which the incident occurred. The incident data may be organized according to the weather conditions the incident occurred. Thus, the incident data may be aggregated for the times in which it was raining at the road segment, aggregated for the times in which there was snow recently at the road segment, and aggregated for the times when extreme temperatures were recorded at the road segment. The number of incidents in these categories is determined and used to create an incident rate for the road segment at each of the possible weather scenarios.

The incident rate is applied to a relationship between speed and incidents. From this relationship, a dynamic speed limit or safe speed is calculated for the particular road segment. The safe speed may be used as a threshold for issuing speed alerts to drivers. The safe speed may be used to calculate a route to a destination. The safe speed may be used to set the driving speed of an automated driving system. The following embodiments provide additional details for calculating and implementing a dynamic speed limit.

Figure 1:
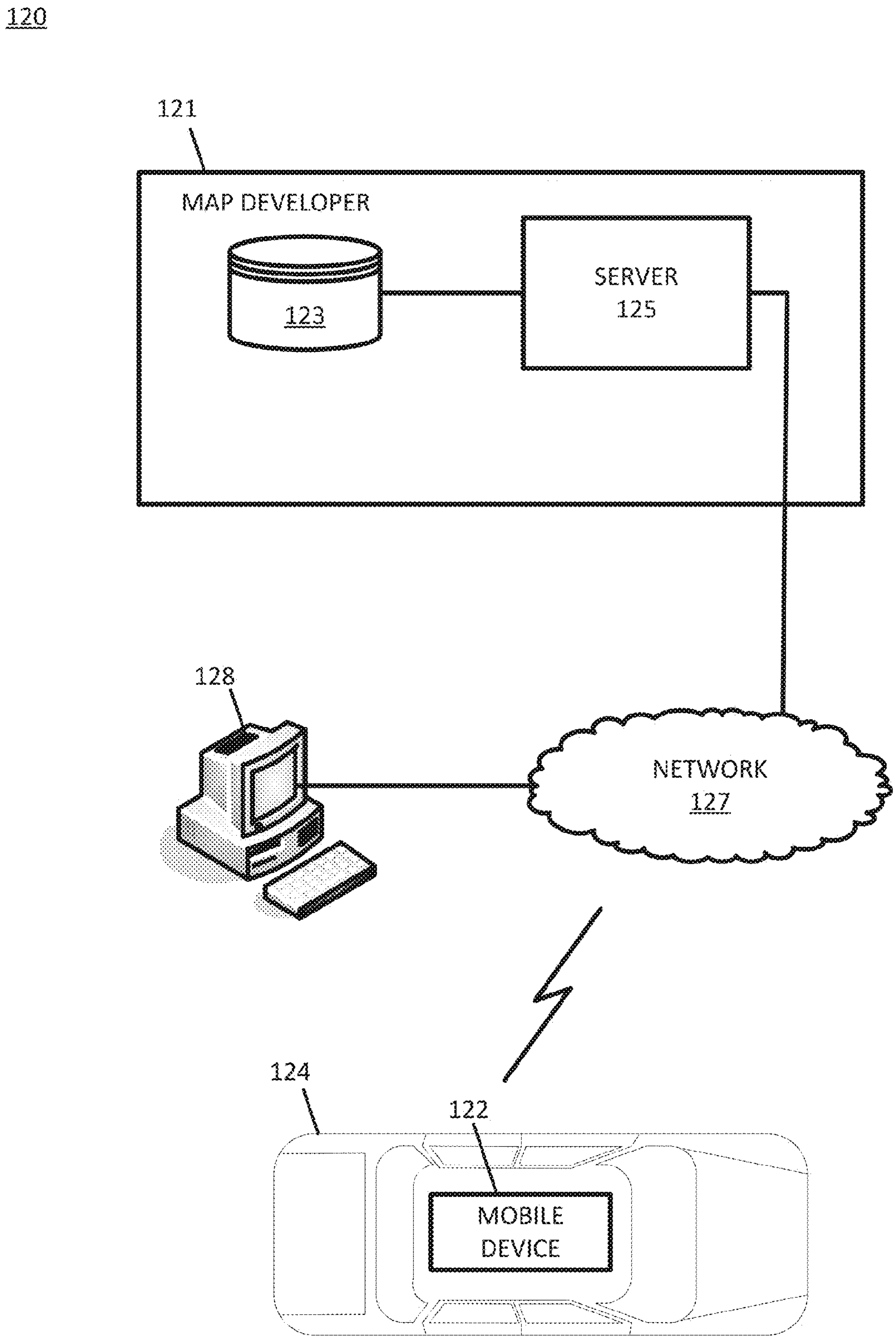
FIG. 1 illustrates an example system for a dynamic speed limit.

FIG. 1 illustrates an example system 120 for determining a dynamic speed limit. The system 120 includes a developer system 121, one or more mobile devices 122, a workstation 128, and a network 127. Additional, different, or fewer components may be provided. For example, many mobile devices 122 and/or workstations 128 connect with the network 127. The developer system 121 includes a server 125 and one or more databases. The database 123 may be a geographic database including road links or segments.

The server 125 may identify an incident probability threshold indicative of an acceptable rate of incident. The incident probability threshold may be a decimal or fractional value between 0 and 1. In some examples, the incident probability relates to the chance of an incident given certain conditions. The incident probability may be the chance that an incident occurs over a predetermined time period by any vehicles. The time period may be 15 minutes, an hour, a day or a week. The incident probability may be scaled appropriately as a function of time. Thus, an incident rate of 0.00001 for a 15 minute time period may correspond to an incident rate of 0.00004 for an hour and 0.00096 for an entire day. The incident probability may be the chance that an incident occurs traversing the road segment by a single vehicle. The incident probability threshold may be constant while other variables, weather and speed traveled are variable. The incident probability may also be scaled as a function of distance. Thus, the incident rate may be defined per unit distance. An incident rate of 0.00004 for a 1 mile stretch of road may be scaled to 0.00002 for a ½ mile portion of the road.

The server 125 may identify a weather condition indicator indicative of a weather condition for a road segment. The weather component may be based on components for various weather factors such as temperature, rain, visibility, and snow. The weather condition indicator may be a vector (e.g., [temperature component; rain component; snow component]). The weather condition indicator may be a score made up of components from the various weather factors. The weather condition indicator may be binary (e.g., 1 for inclement weather and 0 for non-inclement weather). A variety of techniques may be used to determine a weather related incident rate based on the weather condition indicator. Other examples are discussed below.

The server 125 may calculate a safety speed for a vehicle traveling on the road segment based a function of the incident probability threshold and the weather condition indicator. The functional may be linear, non-linear, or a polynomial. In one example, the relationship is an exponential function (e.g., natural exponential function e that is the inverse of the natural log), as shown in Equation 1. In Equation 1, the incident probability threshold (P) is a function of the weather related incident rate (A) based on the weather incident indicator and a speed (S).

$$P=1-e^{-\lambda s} \qquad \text{Eq. 1}$$

The function may be modified to account for a first tuning parameter (α) and a second tuning parameter (β), as shown by Equation 2. The first tuning parameter scales the relationship between speed and the weather related incident rate. The first turning parameter may depend on the units of speed (e.g., miles per hour, meters per second, feet per second, or another unit of speed). The first tuning parameter (α) may depend on the type of vehicle. The server 125 may identify a vehicle type for the vehicle traveling on the road segment. Example vehicle types may include car, truck, sport utility vehicle, convertible, sports car, farm vehicle, compact vehicle or other examples. The type of vehicle may be received in along with location data from the mobile device 122. The type of vehicle may be registered with the server 125. The server 125 may calculate the first tuning parameter (α) for the function of the incident probability threshold and the weather condition value based on the vehicle type. Some vehicle types are prone to more accidents and are assigned higher values for the first tuning parameter (α), and other vehicles are safer and prone to fewer accidents. The vehicle type may be substituted for vehicle make or model, driver type based on demographics, driver types based on individual driving history, driver age, driver impairment or other facts that impact the likelihood that a driver is involved in an incident.

The second turning parameter (β) may affect the magnitude of the impact of the speed and weather product on the incident probability threshold. Higher values of the second tuning parameter (β) cause lower resultant incident probabilities, and lower values of the second tuning parameter (β) cause higher resultant incident probabilities.

The second tuning parameter (β) may relate to the time of day, day of week, or day of year. Some periods during the day may be more dangerous such as rush hour or late at night. Some days such as weekdays may be more dangerous that weekends or holidays. Some days of the year such as New Year's Eve and St. Patrick's Day may be more dangerous than other days. Higher risk time may cause a lower second tuning parameter (β), and lower risk times may cause a higher second tuning parameter (β).

The second tuning parameter (β) may be based on traffic levels. The incident rate may be dependent on current traffic levels. The current traffic levels may be received by a traffic service and/or based on probe data collected by mobile devices 122. High traffic levels may cause a lower second tuning parameter (β), and lower traffic levels may cause a higher second tuning parameter (β).

$$P=1-\beta e^{-\alpha\lambda s} \qquad \text{Eq. 2}$$

Using Equation 1 or Equation 2, the server 125 may calculate a representative speed value that corresponds to the safest maximum speed for a particular set of weather conditions and a particular road segment. For example, the server 125 may calculate a representative speed value for the maximum speed for the current weather conditions and the current road segment. The server 125 may query a lookup table to convert the representative speed value of Equation 1 and 2 and the absolute speed that is traveled by a vehicle.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing. In other embodiments, the mobile device 122 or the workstation 128 performs a majority of the processing. In addition, the processing is divided substantially evenly between the server 125 and the mobile device 122 or workstation 128.

Figure 2A:
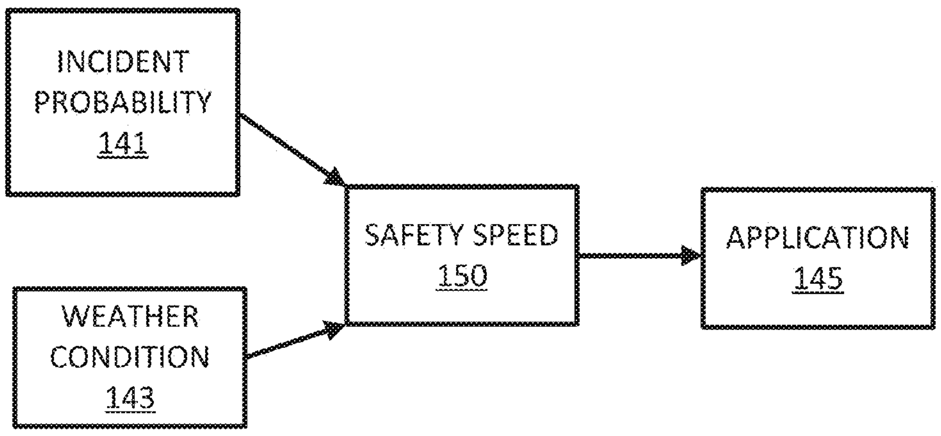
FIG. 2A illustrates an example block diagram for calculation of the dynamic speed limit.

FIG. 2A illustrates an example block diagram for calculation of the dynamic speed limit. The block diagram includes the inputs incident probability 141 and weather condition indicator 143 for calculating an output safety speed 150, according to the relationship described above. Additional, different, or fewer steps may be included in the algorithm represented by the block diagram.

The safety speed 150 may be applied to a variety of applications 145, including driver alerts, speed maps, destination routing, and driving commands. The driver alerts may be sent to users of mobile devices 122. In some examples, the mobile device 122 includes a navigation application that tracks the movement of the user. The navigation application may generate data indicative of a current speed of the vehicle traveling on the road segment. The server 125 (or mobile device 122) compares the current speed to the safety speed based on current weather conditions. The weather conditions may be determined by sensors at the vehicle 124 or from a weather service according to the current location of the vehicle 124. An alert is generated when the current speed exceeds the safety speed.

In one example, the incident probability threshold for defining the safety speed is a predetermined value. The incident probability threshold may be set by default or by a government related authority. The incident probability threshold may be required by an automobile insurance provider to guarantee an insurance rate for the driver. The incident probability threshold may be set by a user selection. For example, the driver or user of the mobile device 122 may select an absolute value (e.g., 0.4 or 0.6) value for the incident probability threshold or a general description (e.g., low risk, medium risk, or high risk) for the incident probability threshold.

The speed maps may be a navigational map for the region of the mobile device 122 that include one or more graphical indicators of the current dynamic speed limit of one or more road segments. The road segments with relatively low dynamic speed limits, which may be treacherous roads, may be encoded in one color, and the road segments with relatively high dynamic speed limits, which may be safer roads, may be encoded with another color. In one alternative, the road segments with relatively low dynamic speed limits, which may be treacherous roads, may be encoded in one width size, and the road segments with relatively high dynamic speed limits, which may be safer roads, may be encoded with another width size. The relative speed limits of the roads may be easily ascertained by viewing the speed maps and observing the relative widths of the roads. Additional display options are discussed below.

The server 125 or the mobile device may perform destination routing based on the dynamic speed limit or safety speed. A set of possible routes may be generated based on a current location (or other origin location) and a destination location. The possible routes may be compared according to the dynamic speed limit. For example, an amount of time to traverse the various routes may be calculated assuming the driver adheres to the dynamic speed limits of the road segments of the route. The dynamic safety speeds may be based on historical weather information, current weather conditions, forecasted weather conditions, or a combination. The possible routes may be filtered to eliminate routes having particularly low speed limits, which indicate treacherous roads. The server 125 or mobile device 122 may eliminate routes with one or more road segment that is less than a threshold percentage (e.g., 50%) of the fair weather speed limit of the road segment.

The server 125 or the mobile device 122 may generate one or more driving commands based on the dynamic speed limit. The commands may control the operating speed of a vehicle including an automated driving system. The automated driving system may operate an accelerator or throttle of the vehicle within the confines of the dynamic speed limit. The automated driving system may limit the speed of a human operating within the confines of the dynamic speed limit. Additional automated driving examples are discussed below.

Figure 2B:
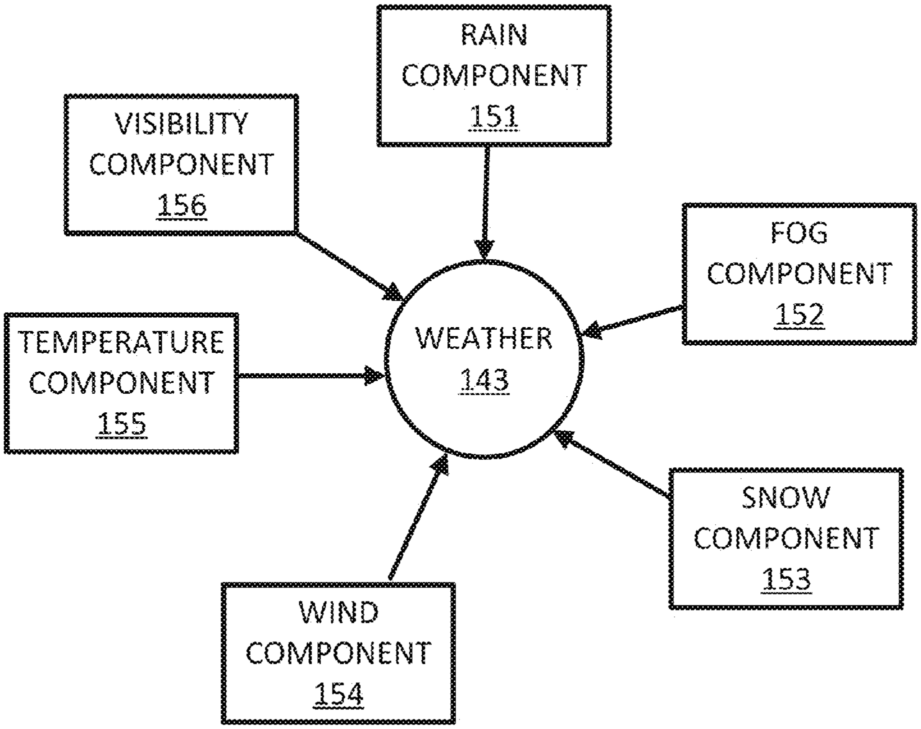
FIG. 2B illustrates an example block diagram for determination of a weather component.

FIG. 2B illustrates an example block diagram for determination of a weather condition indicator 143. The weather components make up the weather condition indicator 143 upon which the weather related incident rate (A) is based. In addition, the weather components makeup the historical data used to define the relationship between the weather and the incident rate.

The weather components may include individual components for a variety of types of weather. The weather components may include a rain component 151, a fog component 152, a snow component 153, a wind component 154, a temperature component 155, and a visibility component 156. Other types of weather may also be used. The weather components may be receives from weather stations, radar stations, surface monitoring stations near the road surface, sensors associated with the vehicle, or any combination.

The precipitation component 151 (e.g., rain component) describes current or recent intensity of precipitation levels for the road segment. Precipitation may causes pavement to become wet, increasing the rate of incidents. The rain component may be high during heavy rain. However, very light rain may also be hazardous. Light precipitation such as drizzle can dampen roadways slightly causing a film to develop with the oily residue on the road. This may be more hazardous that a heavier rain that washed away the oil. Thus, light rain may have a higher rain component 151 that medium or heavy rain.

The fog component 152 describes current or recent fog levels for the area near the road segment. Fog effects visibility, increasing the rate of incidents. The snow component 153 describes recent or current snowfalls or snow accumulation in the area near the road segment. Falling snow or accumulated snow may make roadways slick or treacherous. The wind component 154 describes current wind levels. High winds may increase the rate of incidents.

A temperature component 155 describes the current temperature near the road segment. Very high temperatures or very low temperatures may impact the rate of incident on the road segment. High temperatures may causes road surfaces or vehicles to behave erratically. Low temperature may increase the risk of slick roads. For example, when low temperatures are combines with any precipitation (snow or rain), the incident rate may be increased dramatically. The temperature components 155 may include an air temperature, a dew point, or a road surface temperature.

Some temperatures near the freezing point may be especially hazardous. Such temperatures may cause light moisture at near freezing temperature to form black ice. Thus, the temperature component 155 may have higher values near the freezing point of water and lower values well above or below the freezing point.

The visibility component 156 may be an independent variable or determined as a function of the other wind components. The visibility may be measured as a distance that an object can be viewed along the road from the vehicle. The visibility may be measured with a laser transmitter and receiver (e.g., transmissionmeter) or an infrared transmitter and receiver (e.g., forward scatter visibility sensor). These instruments measure the attenuation of a signal traveling through air and visibility is calculated from the attenuation.

Each or some of the weather components may be binary (e.g., a 1 value indicates the type of weather is present and a 0 indicates that the weather is not present). Each or some of the weather components may be rating value between 0 and 10 or a fraction value between 0 and 1. The weather components may be combined to determine the weather condition indicator. The weather components may be summed, averaged, or otherwise combined according to a predetermined matrix or formula containing weights or coefficients. In one example, fractional values for the weather component are summed as the sum of the squares of the components to calculate the weather condition indicator.

Figure 3:
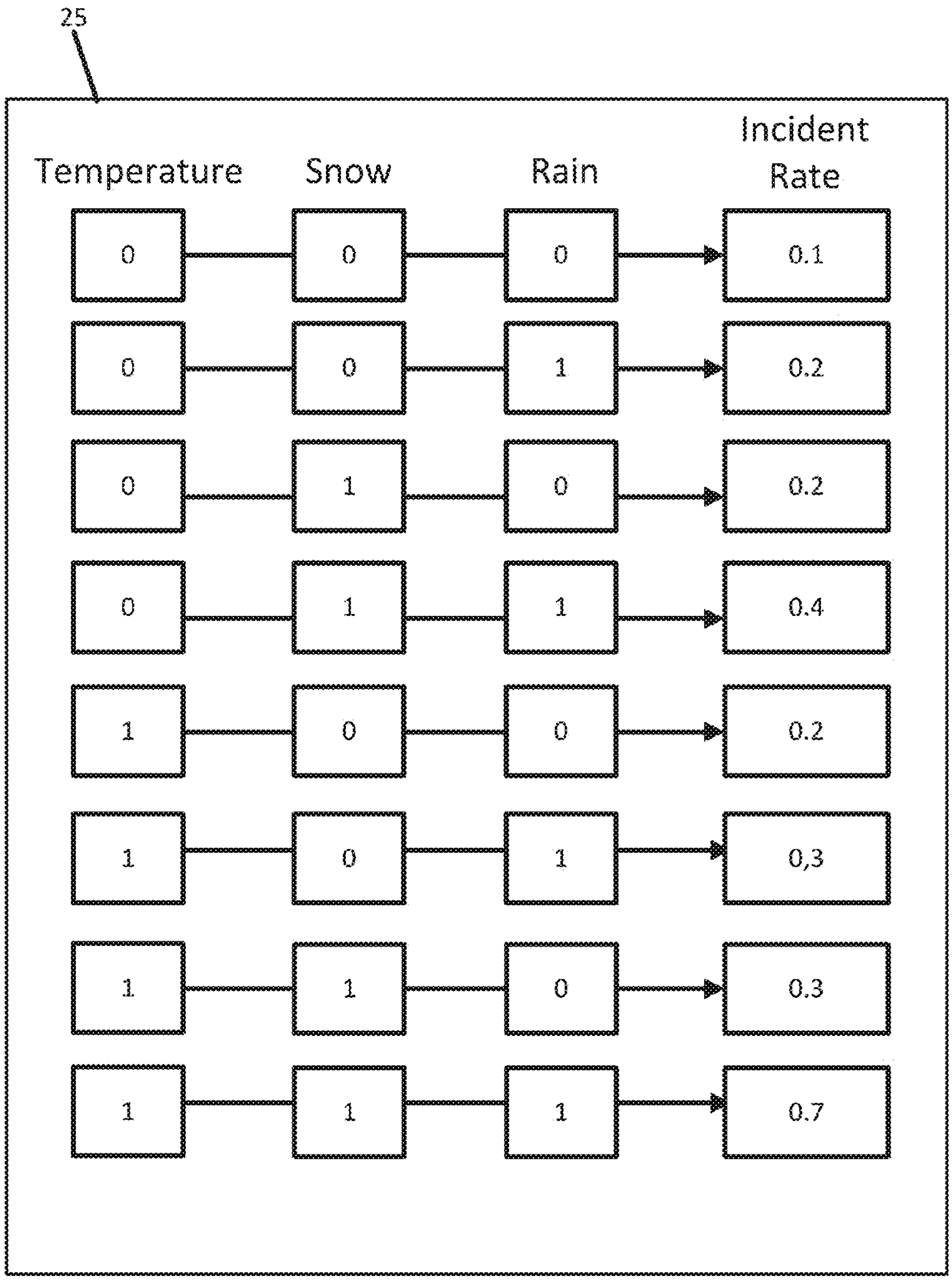
FIG. 3 illustrates an example chart for incident probability.

FIG. 3 illustrates an example table 25 for incident probability using binary values. Three weather components are shown for temperature, snow, and rain. Because the components are binary, the total number of combinations is 8 ($2^n=8$ where n is the number of weather components). The combinations for (temperature, now, rain) include (0,0,0), (0,0,1), (0,1,0), (0,1,1), (1,0,0), (0,0,1), (0,1,0), and (1,1,1). Thus, any weather conditions fits into one of these combinations. An incident rate is assigned to each combination, as shown by FIG. 3.

The incident rate may calculated based on historical data. The incident rate for the combination may be based on the share of that combination of the total incident. For example, for each of the weather combinations the historical data is analyzed to define a quantity of incidents that occur on the road segment during that weather combination. The quantity is divided by the total number of incidents on the road segment in all weather combinations. In this example, the sum of the incident rate for the weather combinations is 1.

In another example, the incident rate is based on the likelihood of an incident for any given traversal of the road segment. In this example, the quantity of incidents that occur on the road segment during that weather combination is divided by the total number of traversals of the road segment during the weather combination. Each weather combination has an independent value for the incident rate. In this example, the incident rates may be much lower than the values shown in FIG. 3. Example incident rates may be on the order of 1 out of every 10,000 traversals or 0.0001. Some particular road segments may be more susceptible to hydroplaning, ice, floods, or another hazard.

The historical data for each road segment may be lumped together as one large set that is divided according to the weather combinations. In another example, the historical data may also be divided defined according to time of day, day of year, or day of week. Thus, a different set of historical is used for each day of the week, each hour or hour range of the day, or in another categorization. In one example of finely divided timer period, 15 minute epochs are used, and the traffic data is formatted into 96-dimensional vectors, in which each of the 96 components describe traffic for a different 15 minute epoch. For example, a daily vector having 96 components may be defined as $\vec{x}$=(x_1, . . . , x_n), where n=96. The values contained in the vector indicate whether an incident occurred or a quantity of incidents for all traversal of the road segment. For example, the first element of the vector is the average speed for time between 0:00 a.m. to 0:15 a.m., and the 50th element of the vector is the average speed for time between 12:15 p.m. and 12:30 p.m. Other vectors may be used. In another example, some days may have only two time epochs: rush hour and not rush hour.

Figure 4:
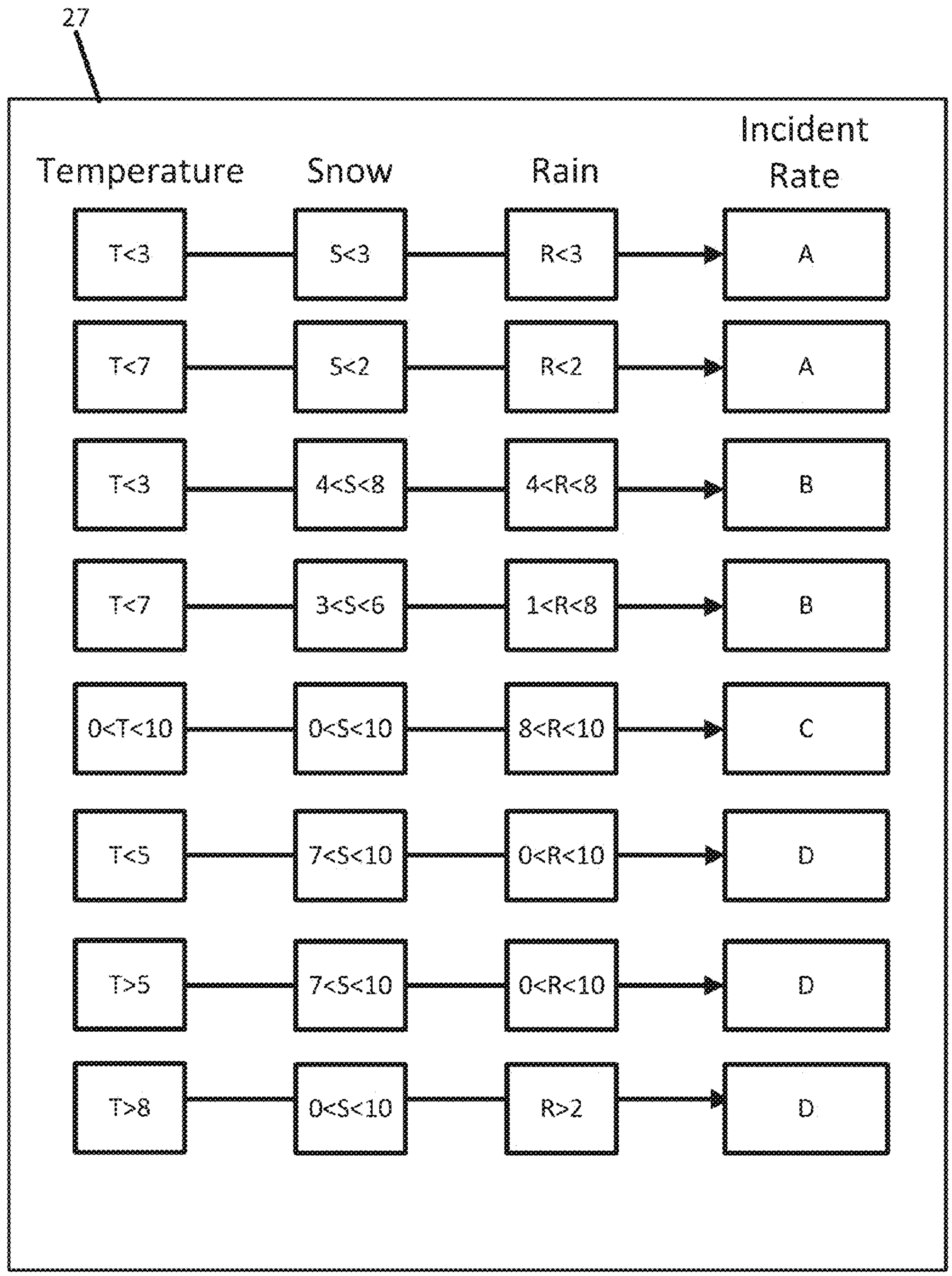
FIG. 4 illustrates another example chart for incident probability.

FIG. 4 illustrates another example table 27 for incident probability. The table 27 illustrates integer values between 0 and 10 for the weather components. The incident rates may be assigned to integer ranges for the weather components. The incident ranges may be broader classes of incident risk. For example, an incident rate of A may represent low risk, an incident rate of B may represent medium risk, an incident rate of C may represent high risk, and an incident rate of D may represent very high risk. An incident rate of A may compare to a probability equal to or on the order of $1\times10^{-5}$. An incident rate of B may compare to a probability equal to or on the order of $1\times10^{-4}$. An incident rate of C may compare to a probability equal to or on the order of $1\times10^{-3}$. An incident rate of D may compare to a probability equal to or on the order of $1\times10^{-2}$.

The ranges of the weather components are matched with risk levels. The temperature component may range from 0 to represent normal temperature to 10 to represent extreme hot or cold temperatures. The snow component may range from 0 to represent the absence of snow to 10 to represent heavy falling snow or significant accumulated snow. The rain component may range from 0 to represent the absence of rain to 10 to represent heavy falling rain or recently falling rain.

A few examples from FIG. 4 include an incident rate of A that corresponds to a temperature component below 3, a snow component below 3, and a rain component below 3. An example incident rate of B corresponds to a rain component between 4 and 8, a snow component between 4 and 8, and any temperate component below 7. An example incident rate of C corresponds to a rain component between 8 and 10, any temperature component value and any snow component value. An example incident rate of D may corresponds to a snow component between 7 and 10 and a temperate component above 5 with any rain component values. The incident rate of D may correspond to freezing temperatures occurring with any precipitation.

Figure 5:
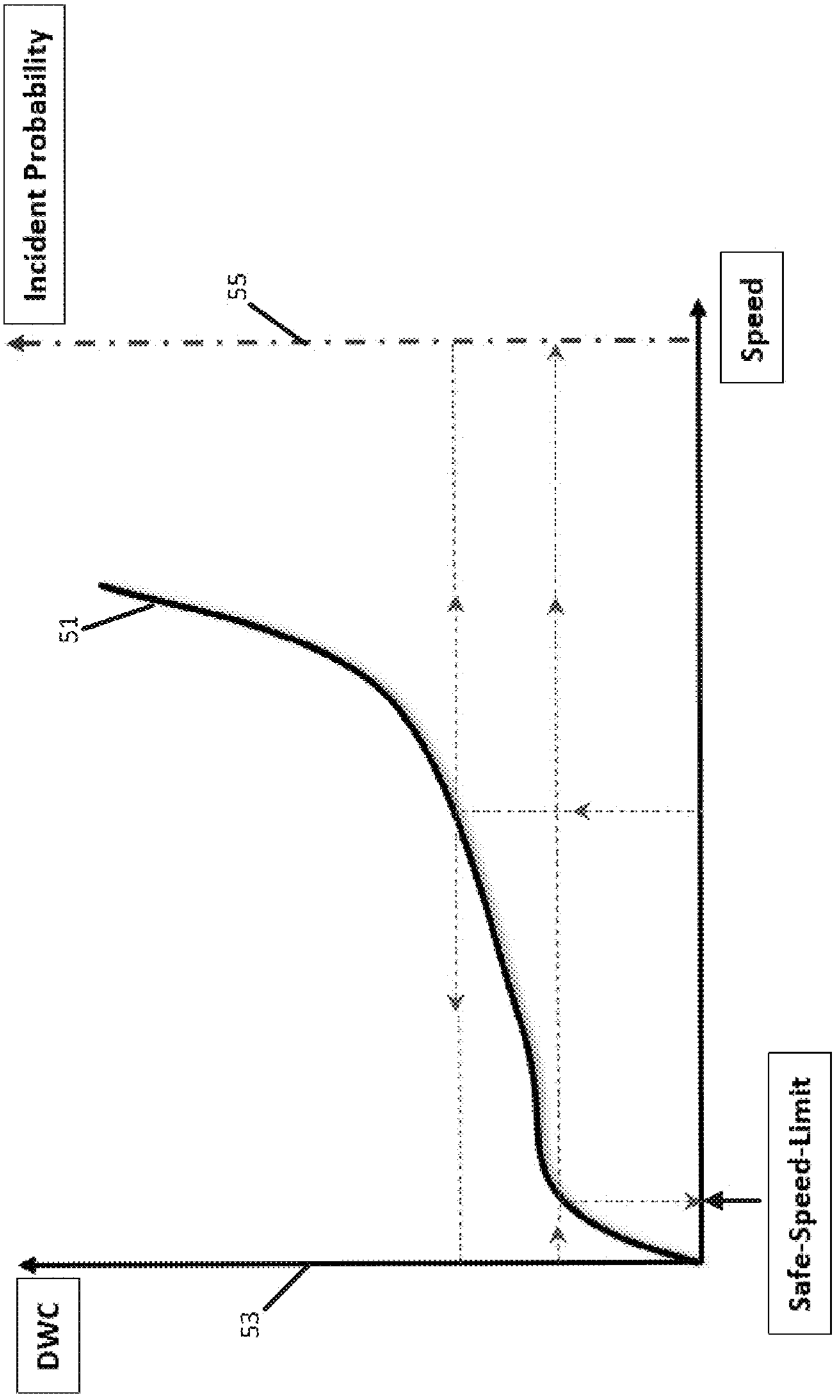
FIG. 5 illustrates an example chart for incident probability.

FIG. 5 illustrates an example chart for incident probability. Confidence curve 51. The horizontal X-axis represents speed. The vertical Y-axis represents two aspects. The quantity of dangerous weather conditions (DWCs) or the weather conditional indicator is represented by the solid axis 53. It should be noted that the DWC is a label and not include any dangerous conditions. The incident probability based on the speed and the quantity of DWCs is represented by the dotted axis 55. For any position along the confidence curve 51, an incident probability corresponds to a DWC quantity and a speed.

Figure 6:
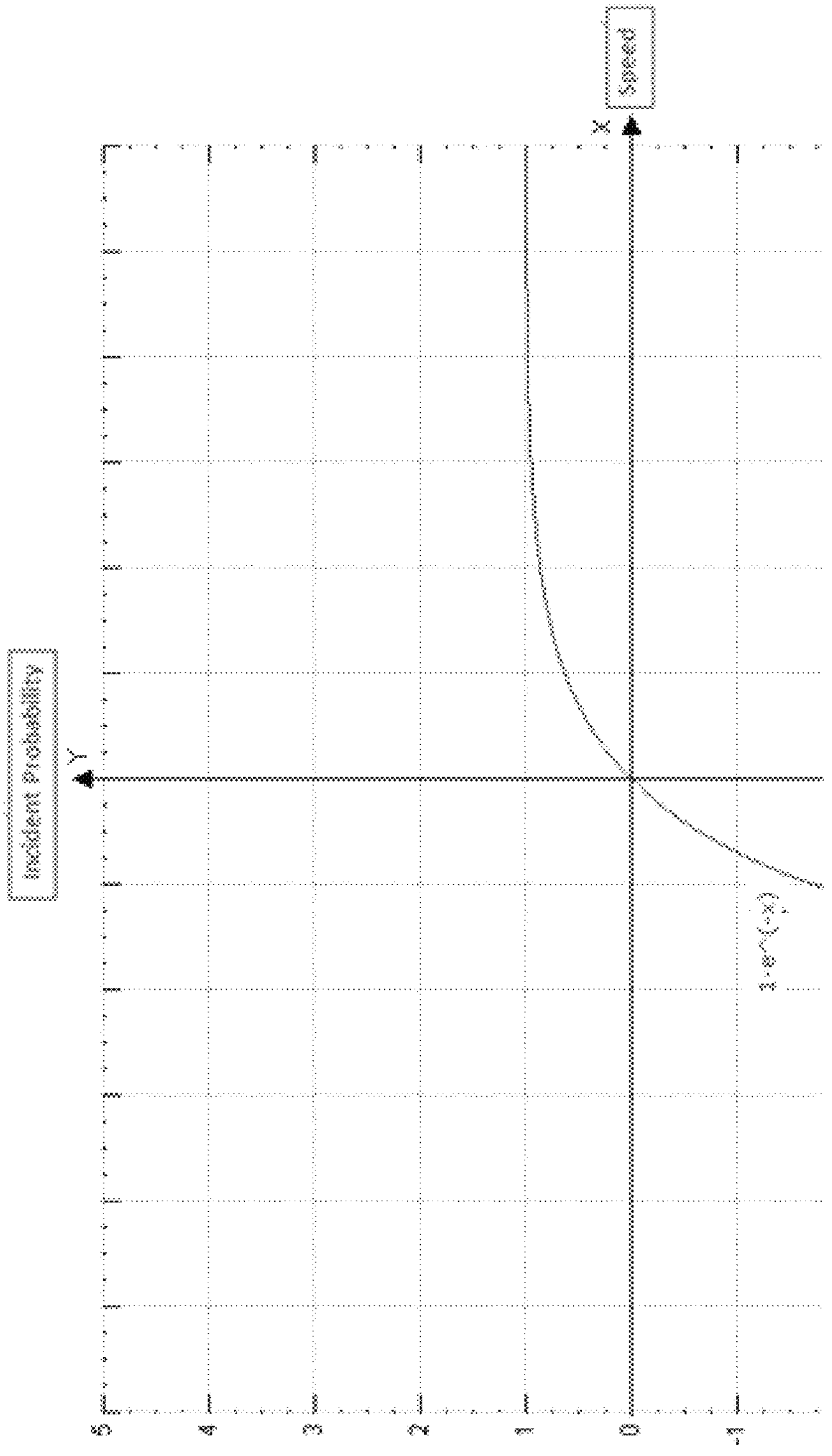
FIG. 6 illustrates an example chart for a relationship between speed and incident probability.

FIG. 6 illustrates an example chart 60 for a relationship between speed and incident probability. As shown by Equations 1 and 2 above, for any given weather related incident rate (λ), the speed (x) and resulting incident probability (y) are related by an exponential function. FIG. 6 illustrates an example in which the weather related incident rate is 1 (λ=1). Other formula may be used for the relationship.

Figure 7:
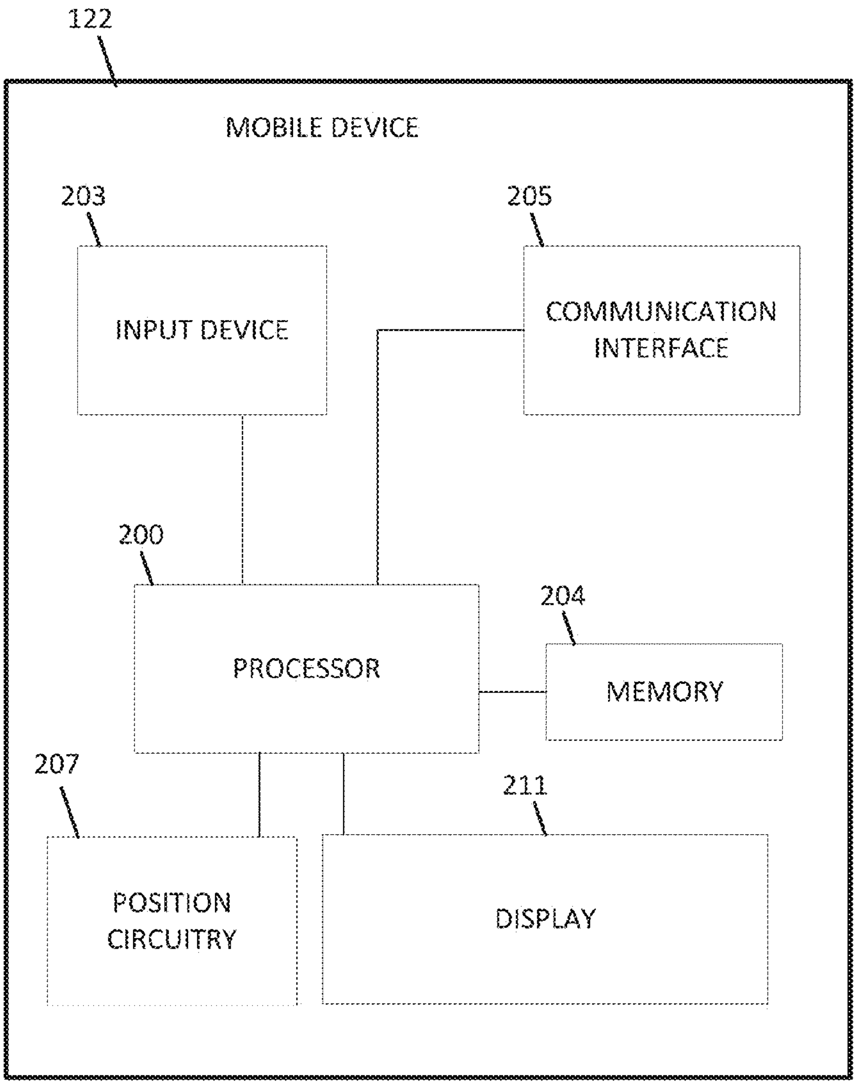
FIG. 7 illustrates an example mobile device for the system of FIG. 1.
Figure 8:
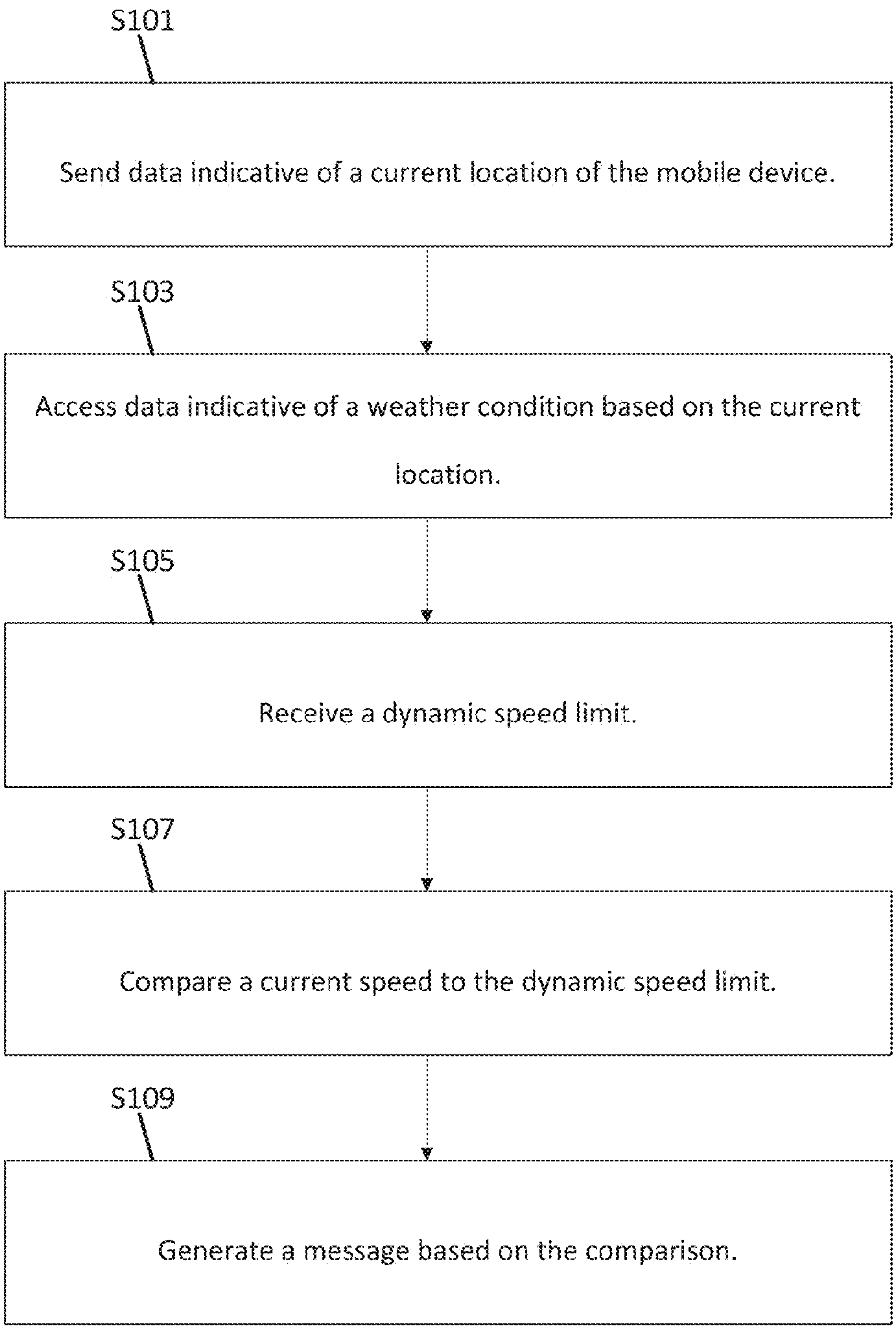
FIG. 8 illustrates an example network device of the system of FIG. 1.

FIG. 7 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device/personal computer 122. FIG. 8 illustrates an example flowchart for requesting or utilization the estimated traffic model. The acts of FIG. 8 may be performed by the mobile device 122, an advanced driving assistance system (ADAS), a HAD device or an autonomous vehicle, any of which may be referred to as a computing device. The acts may be applied in a different order. Acts may be omitted or repeated. Additional acts may be added.

At act S101, the processor 200 or the communication interface 205 sends send data indicative of a current location of the apparatus. The location data may be generated by the position circuitry 207. In one example, the location data includes geographic coordinates (latitude and longitude). In another example, the location data includes a road segment identifier that specifies the current or a future road segment that the mobile device 122 is traveling on. The road segment identifier may be determined by a route that the mobile device 122 has accessed or is following. The road segment identifier may identify a downstream road segment on the route. The downstream road segment may be used so that drivers know in advance to reduce speed when driving through potentially treacherous areas.

At act S103, processor 200, or the server 125, accesses data indicative of a weather condition based on the current location of the apparatus. The weather data may be accessed from memory 204 or database 123. The weather data may be accessed from a weather service using the location through the network 127. Alternatively, the weather data may be detected through one or more sensors communicating with the mobile device. The sensors may include barometric sensors, temperature sensors, humidity sensors and precipitation sensors.

At act S105, the processor 200 or the communication interface 205 receives a dynamic speed limit. The dynamic speed limit may be a maximum speed or a minimum speed, and examples described may be adjusted to account for a minimum speed limit. The dynamic speed limit may be calculated according to the other examples described herein. The dynamic speed limit may be calculated for each road segment along a route. The lowest dynamic speed limit for a sequence of road segments may be applied uniformly to the sequence of road segments. The dynamic speed limit may be based a function of an incident probability threshold and the weather condition. The function may be defined according to a set of historical incident data related past traffic incidents to the location of the incident and the weather condition that existed at the time. The weather condition that existed at the time may be recorded contemporaneously to the incident data or after the fact by consulting weather records and timestamps stored with the incident data.

At act S107, the processor 200 performs a comparison of a current speed of the apparatus to the dynamic speed limit. The current speed may be based on the location data generated by the position circuitry 207. The current speed may be received from a speedometer directly. In that example, the current speed is independent of the location data and based on wheel rotation, driveshaft rotation, or similar measurement. The processor 200 may determine whether the current speed is greater than the dynamic speed limit, less than the dynamic speed limit, or equal to the dynamic speed limit within a threshold range. The processor 200 may calculate a difference between the current speed and the dynamic speed limit.

At act S109, the processor 200 generates a message based on the comparison. The message may be a speed warning to alert the human driver that a safe speed is being exceeded. The speed warning may be an audible alert (e.g., ringtone, beep, or voice recording), a visual alert (e.g., flashing light or graphical message), or a mechanical or haptic alert (e.g., vibration to the mobile device 122 or a seat vibration). The speed warning may be generated only when the current speed exceeds the dynamic speed limit by a predetermined amount (e.g., 10 miles per hour). The speed warning may be sent to the server 125. In some examples, data is logged for drivers that exceed the dynamic speed limit to study how often incidents occur. In some examples, the speed warning is sent to a parent (e.g., with a teenage driver), a manager (e.g., with employee drivers such as taxis, package deliver, or pizza delivery), or a manufacturer (e.g., to determine insurance or warranty status if an incident occurs).

Figure 9:
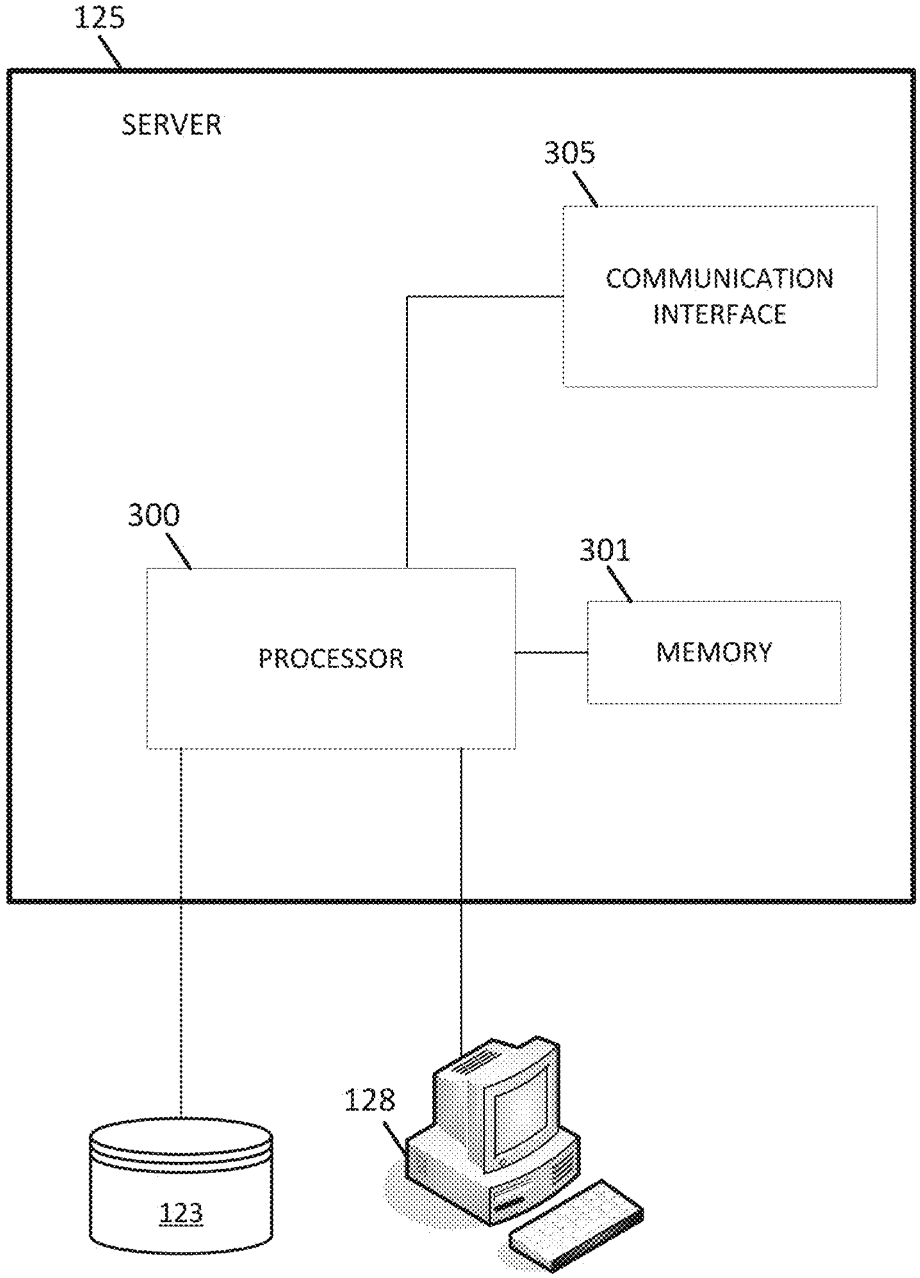
FIG. 9 illustrates an example flowchart for a dynamic speed warning based on weather.
Figure 10:
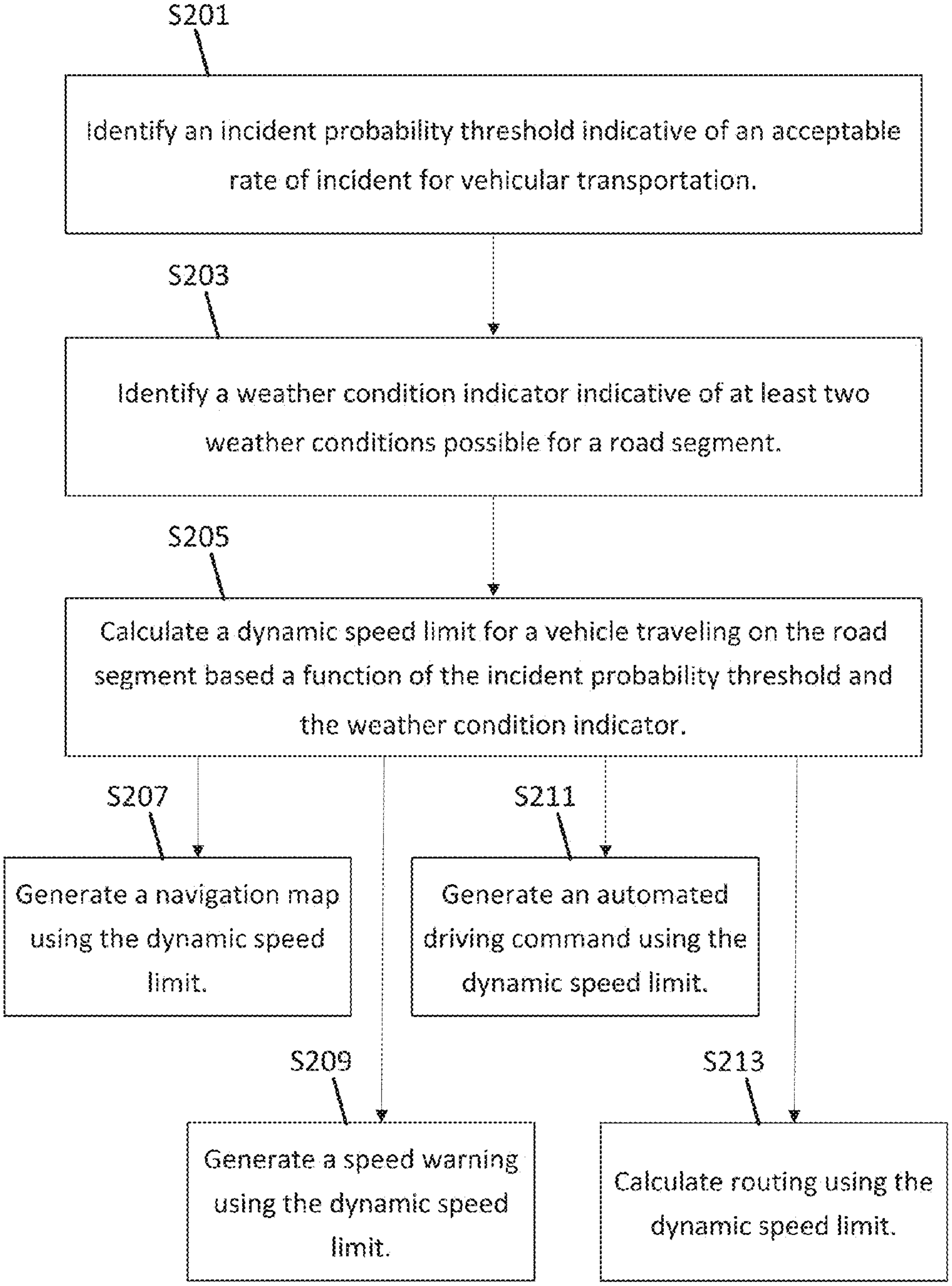
FIG. 10 illustrates an example flowchart for a dynamic speed warning based on weather.

FIG. 9 illustrates an example network device (e.g., server 125) of the system of FIG. 1. The server 125 includes a processor 300, a communication interface 305, and a memory 301. The server 125 may be coupled to a database 123 and a workstation 128. The workstation 128 may be used as an input device for the server 125 for entering values for the thresholds, geographic regions, or other values. In addition, the communication interface 305 is an input device for the server 125. In certain embodiments, the communication interface 305 may receive data indicative of user inputs made via the workstation 128 or the mobile device 122. FIG. 10 illustrates an example flowchart for calculation of the dynamic speed limit. The acts of the flowchart of FIG. 12 may alternatively be performed by the server 125 or another computing device. Different, fewer, or additional acts may be included.

At act S201, the processor 300 identifies an incident probability threshold indicative of an acceptable rate of incident for vehicular transportation. The threshold may be stored in memory 301. The threshold may be received from user input (e.g., from mobile device 122) in a navigation application. An individual driver may select the risk level that the driver prefers. The threshold may be standardized and constant for all drivers. The risk level may be set according to a parent or a manager of company.

At act S203, the processor 300 identifies a weather condition indicator indicative of at least two weather conditions possible for a road segment. The weather condition indicator is based on historical incident data aggregated according to weather conditions.

At act S205, the processor 300 calculates a dynamic speed limit for a vehicle traveling on the road segment based a function of the incident probability threshold and the weather condition indicator. The dynamic speed limit may be calculated directly or indirectly using a speed score. The speed score may be a term (s) in an exponential equation (e.g., $P=1-e^{-\lambda s}$) defined as a function of the incident probability threshold (P) and the weather condition indicator (λ). The speed score may be measured in arbitrary units. The processor 300 may convert the speed score to the dynamic speed limit with speed units (e.g., miles per hour, meters per second, feet per second or other units) using a lookup table. The dynamic speed limit may be used in a various systems.

Any one or any combination of acts S207, S209, S211, and S213 may be performed by the server 125 and the processor 300 or the mobile device 122 and processor 200 ("computing device").

Figure 11:
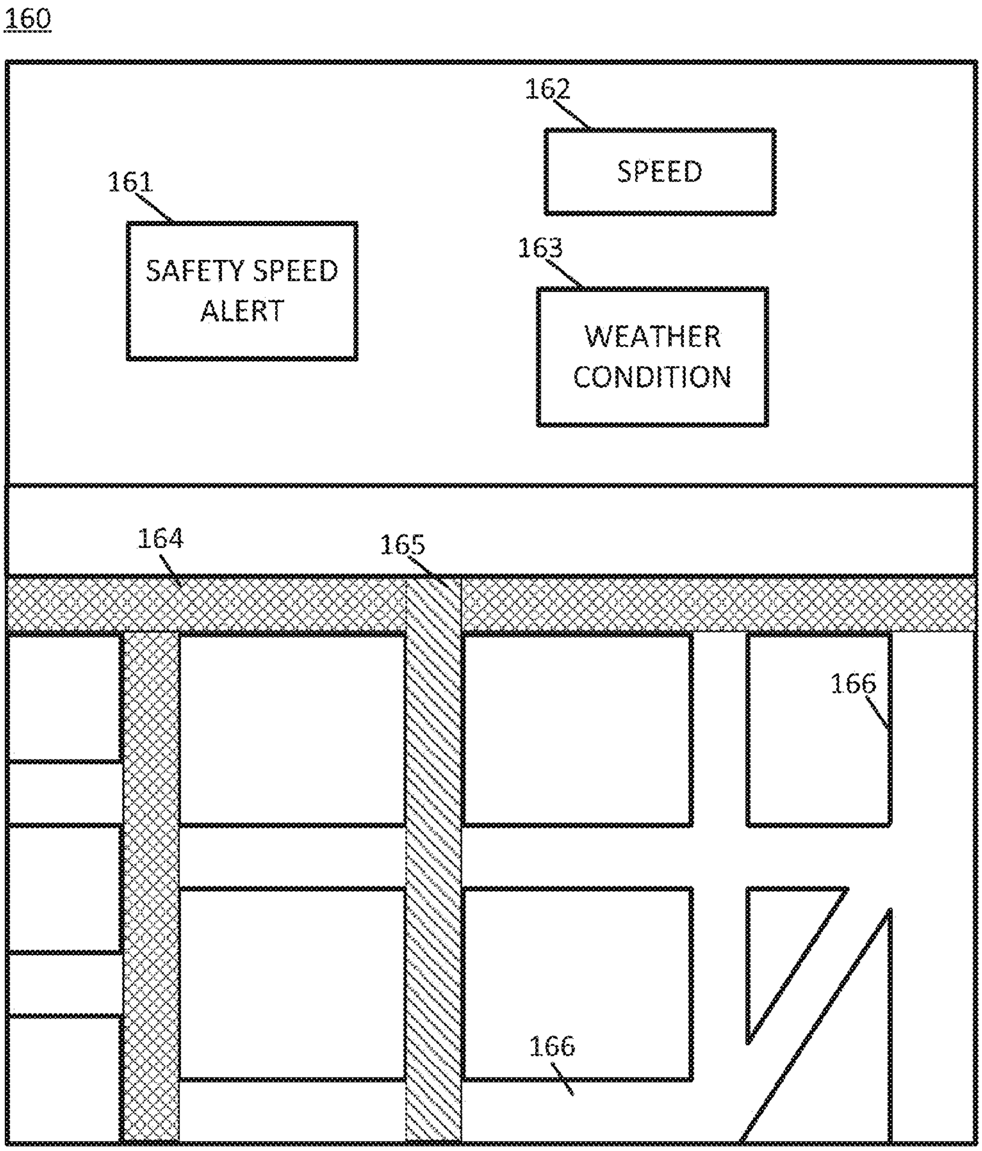
FIG. 11 illustrates an example user interface including a map and a dynamic speed warning.

At act S207, the computing device generates a navigation map using the dynamic speed limit. The preceding acts may be repeated for multiple road segments display on the navigation map. FIG. 11 illustrates an example user interface including navigation map 160. The navigation map 160 includes various roads represented by road segments and assigned different dynamic speed limits.

The dynamic speed limits may be encoded in color. When the dynamic speed limit is within a predetermined range of the speed limit (stored as an attribute for the road segment in database 123 or memory 301), the road may be displayed without color or green (e.g., roads 166). When the dynamic speed limit is more than a first range above the stored speed limit a first color is used (e.g., roads 164), and when the dynamic speed limit is more than a second range above the stored speed limit a second color is used (e.g., 165). Besides color and hatching, numeric values for the dynamic speed limit, different line thickness or other graphical indicia may be used to distinguish the dynamic speed limits of the road.

At act S209, the computing device generates a speed warning. The computing device may receive data indicative of a current speed of the vehicle traveling on the road segment. The computing device compares the current speed to the safety speed, and generates an alert when the current speed exceeds the safety speed. FIG. 11 illustrates an example user interface including the alert (safety speed alert 161). In addition, the current speed 162 of the mobile device 122 or vehicle 124 and the type of weather condition 163 used to determine the dynamic speed limit may be displayed.

At act S211, the computing device generates a driving command based on the safety speed. The driving command may instruct a human driver to change speed or prepare to change speed. The driving command may instruct an assisted driving system to adjust the speed of the vehicle or change another operation of the vehicle.

The term assisted driving system includes autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the driving command derived from the dynamic speed limit and/or the current speed of the vehicle.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the driving command derived from the dynamic speed limit and/or the current speed of the vehicle.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the driving command derived from the dynamic speed limit and/or the current speed of the vehicle.

At act S213, the computing device calculates routing directions using the dynamic speed limit. The routing directions may be a series of maneuvers along a series of road links stored in the database 123. The routing directions may begin at an origin location or the current location of the mobile device 122 and end at a destination or point of interest. One or more of the road links may be selected as a function of the dynamic speed limit. Dynamic speed limits below a threshold may be avoided. Routes may be compared using the series of dynamic speed limits for the road links of the road.

The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The database 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The workstation 128 may be a general purpose computer including programming specialized for providing input to the server 125. For example, the workstation 128 may provide settings for the server 125. The settings may include the probability threshold, the groupings of road segments by time period or sequence of road segments, the first tuning parameter, the second turning parameter, the selection of weather components, and the desired risk level, or other settings. The workstation 128 may include at least a memory, a processor, and a communication interface.

The thresholds for risk levels, incident probabilities, road segment groupings, and the second tuning parameter may be defined by functional classifications for the road links stored as attributes in the database 123. Various classification systems that may assign numeric values for functional class (e.g., 1, 2, 3, 4, and 5). Functional class 1 may be highways while functional class 5 may be small streets.

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The mobile device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The mobile device 122 may communicate with the network 127 and or the server 125 using wireless communication. The wireless communication may include the family of protocols known as WiFi or IEEE 802.11, the family of protocols known as Bluetooth, the family of protocols knows as near field communication (NFC), or cellular technologies (analog advanced mobile phone system (AMPS), the global system for mobile communication (GSM), third generation partnership project (3GPP), code division multiple access (CDMA), personal handy-phone system (PHS), and 4G or long term evolution (LTE) standards), or another protocol. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term “computer-readable medium” includes a single medium or multiple media, such as a centralized or distributed database, and/or associated caches and servers that store one or more sets of instructions. The term “computer-readable medium” shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:

identifying, using a processor, an incident probability threshold indicative of a rate of incident for vehicular transportation, the identifying comprising accessing the incident probability threshold from memory;

identifying, using the processor, a weather condition indicator indicative of a weather condition for a road segment; and calculating, using the processor, a safety speed for a vehicle traveling on the road segment based on a function of the incident probability threshold and the weather condition indicator.

2. The method of claim 1, wherein the weather condition indicator includes a combination of at least two components selected from a temperature component, a snow component, a wind component, a rain component, visibility component, and a fog component.

3. The method of claim 2, wherein the weather conditional indicator is a sum of the squares of the at least two components.

4. The method of claim 1, wherein the weather condition indicator is a decimal or fractional value between 0 and 1.

5. The method of claim 1, further comprising:

receiving data indicative of a current speed of the vehicle traveling on the road segment;

comparing the current speed to the safety speed; and generating an alert when the current speed exceeds the safety speed.

6. The method of claim 5, wherein the alert is an audible alert, a visual alert, or a vibratory alert.

7. The method of claim 1, further comprising:

receiving the incident probability threshold as a user selection.

8. The method of claim 1, further comprising:

identifying a vehicle type for the vehicle traveling on the road segment; and defining a tuning parameter for the function of the incident probability threshold and the weather condition indicator based on the vehicle type.

9. The method of claim 1, further comprising:

displaying data indicative of the safety speed on a map including the road segment.

10. The method of claim 1, further comprising:

selecting a route to a destination based on the safety speed.

11. The method of claim 1, wherein the function of the incident probability threshold (P) and the weather condition indicator is $P=1-e^{-\lambda s}$, wherein P is the incident probability, λ is the weather condition indicator, and the safety speed depends on a safety score s.

12. The method of claim 1, further comprising:

generating a driving command based on the safety speed.

13. An apparatus comprising:

at least one processor; and at least one memory including computer program code for one or more programs; the at least one memory and the computer program code configured to, with the at least one processor, cause the apparatus to at least:

identify an incident probability threshold indicative of a rate of incident over a predefined time period for vehicular transportation, wherein the incident probability threshold is set based on a risk level;

identify a weather condition indicator indicative of at least two weather conditions possible for a road segment, wherein the weather condition indicator is based on historical incident data aggregated according to weather conditions; and calculate a dynamic speed limit for a vehicle traveling on the road segment based a function of the incident probability threshold and the weather condition indicator.

14. The apparatus of claim 13, wherein the at least one memory and the computer program code configured to, with the at least one processor, cause the apparatus to at least:

calculate a speed score based on the function of the incident probability threshold and the weather condition indicator; and convert the speed score to the dynamic speed limit using a lookup table.

15. The apparatus of claim 14, wherein the function of the incident probability threshold (P) and the weather condition indicator is $P=1-e^{-\lambda s}$, wherein P is the incident probability, λ is the weather condition indicator, and s is the speed score.

16. The apparatus of claim 14, wherein the weather conditions include a combination of at least two components selected from a temperature component, a snow component, a wind component, a rain component, visibility component, and a fog component.

17. The apparatus of claim 14, wherein the at least one memory and the computer program code configured to, with the at least one processor, cause the apparatus to at least:

receive data indicative of a current speed of the vehicle traveling on the road segment;

compare the current speed to the safety speed; and generate an alert when the current speed exceeds the safety speed.

18. The apparatus of claim 14, wherein the at least one memory and the computer program code configured to, with the at least one processor, cause the apparatus to at least:

generate a driving command based on the safety speed.

19. An apparatus comprising:

at least one processor; and at least one memory including computer program code for one or more programs; the at least one memory and the computer program code configured to, with the at least one processor, cause the apparatus to at least:

send data indicative of a current location of the apparatus;

wherein data indicative of a weather condition is accessed based on the current location of the apparatus;

receive a dynamic speed limit for a vehicle traveling on the road segment based a function of an incident probability threshold and the weather condition, wherein an incident is a vehicular accident, collision or a vehicle that has run off the road;

perform a comparison of a current speed of the apparatus to the dynamic speed limit; and generate a message based on the comparison.

20. The apparatus of claim 19, wherein the message includes an automated driving command or a warning alert.

* * * * *